United States Patent
Lauer et al.

(10) Patent No.: US 8,965,853 B2
(45) Date of Patent: Feb. 24, 2015

(54) DISTRIBUTED SYSTEM HAVING A SHARED CENTRAL DATABASE

(75) Inventors: Will C. Lauer, Bryan, TX (US); David J. Soares, Worchester, MA (US); Benjamin J. Tracy, Chelmsford, MA (US)

(73) Assignee: CA, Inc., New York, NY (US)

( * ) Notice: Subject to any disclaimer, the term of this patent is extended or adjusted under 35 U.S.C. 154(b) by 20 days.

(21) Appl. No.: 13/493,893

(22) Filed: Jun. 11, 2012

(65) Prior Publication Data

US 2012/0254214 A1 Oct. 4, 2012

Related U.S. Application Data

(62) Division of application No. 12/757,845, filed on Apr. 9, 2010, now Pat. No. 8,606,756.

(51) Int. Cl.
*G06F 7/00* (2006.01)
*G06F 17/00* (2006.01)
*G06F 17/30* (2006.01)

(52) U.S. Cl.
CPC .................. *G06F 17/30545* (2013.01)
USPC ....................................................... 707/690

(58) Field of Classification Search
CPC ............... G06F 17/30286; G06F 17/30067; G06F 17/30008; G06F 17/30595; G06F 11/0751
See application file for complete search history.

(56) References Cited

U.S. PATENT DOCUMENTS

| | | | |
|---|---|---|---|
| 6,216,169 B1 | 4/2001 | Booman et al. ............... | 709/246 |
| 6,240,416 B1 | 5/2001 | Immon et al. .................... | 707/10 |
| 6,314,465 B1 * | 11/2001 | Paul et al. ...................... | 709/226 |
| 6,615,223 B1 | 9/2003 | Shih et al. ...................... | 707/201 |
| 7,130,974 B2 | 10/2006 | Iwamura et al. ............... | 711/162 |
| 7,177,901 B1 * | 2/2007 | Dutta ............................. | 709/203 |
| 7,757,226 B2 | 7/2010 | Srivastava et al. ............. | 717/170 |
| 7,797,292 B2 | 9/2010 | Clark et al. .................... | 707/704 |
| 7,930,312 B2 * | 4/2011 | Hild et al. ...................... | 707/758 |
| 7,945,551 B1 | 5/2011 | Alpern et al. .................. | 707/706 |
| 2002/0188610 A1 * | 12/2002 | Spencer, Jr. ...................... | 707/10 |
| 2003/0009753 A1 * | 1/2003 | Brodersen et al. ............. | 717/172 |
| 2003/0130985 A1 * | 7/2003 | Driesen et al. ..................... | 707/1 |
| 2004/0015468 A1 | 1/2004 | Beier et al. ........................ | 707/1 |
| 2005/0015436 A1 | 1/2005 | Singh | |

(Continued)

OTHER PUBLICATIONS

In U.S. Appl. No. 12/757,845, a Final Office Action was mailed on Nov. 8, 2012.

(Continued)

*Primary Examiner* — Ajay Bhatia
*Assistant Examiner* — Jessica N Le
(74) *Attorney, Agent, or Firm* — Pillsbury Winthrop Shaw Pittman LLP

(57) ABSTRACT

A method for converting a distributed system includes providing a central database in communication with a database, in which the central database includes central schema information for accessing data stored in the central database. The method further includes transferring content data and schema information from the database to the central database for storage. The method further includes connecting schema information stored in the database to the central schema information such that each database is configured to receive a request for information, redirect the request from the database to the central database based on the referenced schema information, and receive, from the central database, the requested information.

20 Claims, 8 Drawing Sheets

(56) References Cited

U.S. PATENT DOCUMENTS

| | | | |
|---|---|---|---|
| 2005/0050071 A1* | 3/2005 | Debrunner | 707/100 |
| 2005/0149584 A1* | 7/2005 | Bourbonnais et al. | 707/204 |
| 2005/0154708 A1* | 7/2005 | Sun | 707/3 |
| 2005/0234922 A1 | 10/2005 | Parekh et al. | 707/10 |
| 2005/0251523 A1* | 11/2005 | Rajamani et al. | 707/100 |
| 2006/0036624 A1* | 2/2006 | Hild et al. | 707/100 |
| 2007/0038702 A1* | 2/2007 | Taylor et al. | 709/206 |
| 2007/0055833 A1* | 3/2007 | Vu et al. | 711/162 |
| 2007/0073767 A1* | 3/2007 | Springer et al. | 707/103 R |
| 2008/0016080 A1* | 1/2008 | Korn et al. | 707/10 |
| 2008/0098000 A1 | 4/2008 | Koretz et al. | 707/10 |
| 2008/0177785 A1 | 7/2008 | Prager et al. | 707/103 R |
| 2008/0215580 A1* | 9/2008 | Altinel et al. | 707/5 |
| 2008/0222163 A1 | 9/2008 | Hild et al. | 707/10 |
| 2008/0229244 A1* | 9/2008 | Markus et al. | 715/811 |
| 2008/0256143 A1* | 10/2008 | Reddy et al. | 707/204 |
| 2008/0281824 A1 | 11/2008 | Rangadass | |
| 2009/0119346 A1* | 5/2009 | Lu et al. | 707/201 |
| 2010/0049721 A1* | 2/2010 | Anderson et al. | 707/10 |
| 2010/0125584 A1* | 5/2010 | Navas | 707/747 |
| 2010/0138821 A1* | 6/2010 | Driesen et al. | 717/168 |
| 2010/0153394 A1 | 6/2010 | Wood | 707/737 |
| 2010/0228829 A1* | 9/2010 | Niv | 709/206 |
| 2011/0119236 A1 | 5/2011 | Debrunner | 707/667 |
| 2011/0153351 A1 | 6/2011 | Vesper et al. | 705/2 |
| 2011/0238632 A1 | 9/2011 | Vandervort et al. | 707/690 |
| 2011/0252005 A1 | 10/2011 | Lauer et al. | 707/690 |
| 2012/0017000 A1 | 1/2012 | Lim | 709/229 |
| 2012/0079049 A1* | 3/2012 | Rawat et al. | 709/206 |

OTHER PUBLICATIONS

Notice of Allowance issued for U.S. Appl. No. 12/757,845, dated Aug. 5, 2013.

* cited by examiner

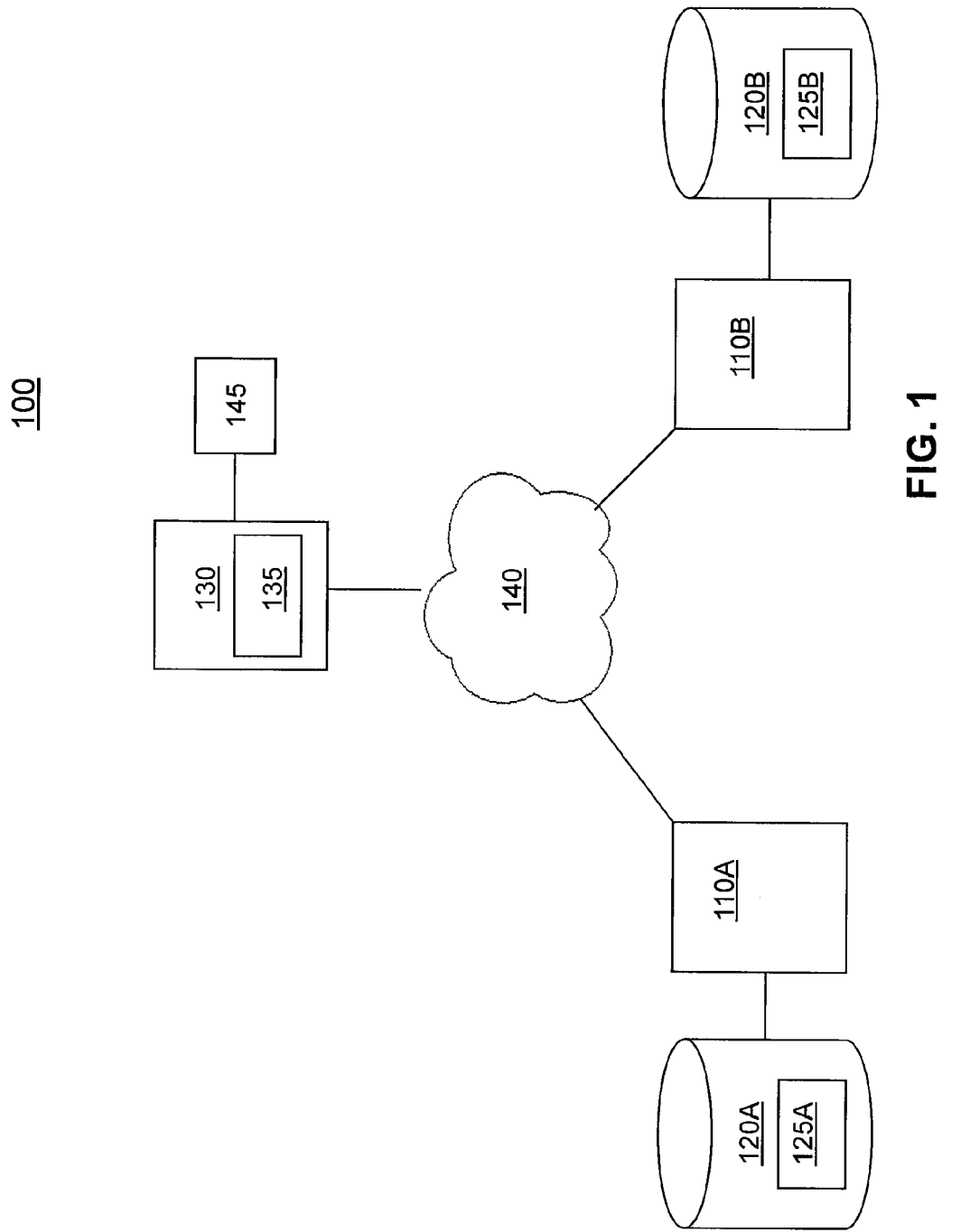
FIG. 1 (Conventional)

DISTRIBUTED SYSTEM HAVING A SHARED CENTRAL DATABASE

This application is a divisional of U.S. patent application Ser. No. 12/757,845, filed Apr. 9, 2010, the disclosure of which is hereby incorporated by reference in its entirety.

FIELD

This disclosure generally relates to database management, and more specifically, to a distributed database system having a shared central database for central storage of data for all machines in the system.

BACKGROUND

Distributed database systems that ensure the quality of services across an entire infrastructure enable users, among other things, to manage a diverse collection of devices, from numerous vendors, isolate the source of performance degradation, minimize recurring expenses, and provide detailed and executive level historical reporting.

FIG. 1 shows a conventional architecture for a distributed database, system 100. Conventional system 100 generally includes multiple backend servers 110 which are configured to collect and locally store data in one or more databases 120. The information which is collected by the backend servers 110A, 110B and stored on database 120A, 120B may vary, for example.

Schema information 125 for managing and accessing each database 120 is maintained independently in its respective backend database 120. As shown, local schema information 125A, 125B is used by the backend databases 120A, 120B for managing and accessing data.

A frontend server 130 is configured to request information from one or more of the backend servers 110, and process such requests. The backend servers 110 are in communication with the frontend server 130, for example, via one or more networks 140.

One or more users 145 may interface with the frontend server 130. In order to communicate with the backend server 110, the frontend server 130 may include schema information 135 for all backend server 110 in the system. A user 145 may submit a request to the frontend computer 130, which in turns submits requests to one or more of the backend servers 110.

In one example, the frontend server 130 may generate reports based on information collected by one or more of the backend servers 110. In response to such a request, each backend server 110 retrieves the information from its database 120 and then submits this information to the frontend server 130. The frontend server 130 may subsequently compile and process the information. Processed results may then be subsequently transmitted to the client computer 145. Requests for information may also be made between various backend servers 110.

In order for the various servers (i.e., the frontend server 130 and backend servers 110) to properly communicate amongst themselves, replication and synchronization processes must be performed. Replication copies information from one machine for subsequently transmitting to another machine. This process is not instantaneous. Thus, a synchronization process is used to reconcile different information and conflicts between machines. However, synchronization and replication in this conventional manner are error-prone and fragile.

SUMMARY

Systems and methods are disclosed for managing a distributed system having a shared central database. The shared central database provides central storage of data for all machines in the system. Data in the central database may be stored in one or more data stores. To access such information, the central database includes central schema information for accessing information from the data store(s).

Requests for information from the central database may be made central database by each machine in the system. Since all machines in the system may have access to the information in the central database, there is no need for synchronization between machines as was required in the conventional system. Instabilities and inconsistencies between the various servers, which were found in the conventional system, can be eliminated with the system. Thus, the reliability of data in the system is greatly improved as compared to the convention system. Moreover, each of the backend databases in the system includes local schema information which references at least a portion of the central schema information for accessing information from the central database. This enables the system to maintain the illusion of data storage in independent databases in the system. Thus, legacy applications and programs which were configured to operate in the conventional system may also operate in the system without modification. Calls to backend servers by legacy applications and programs which were configured to request information from one or more local databases, may be seamlessly routed to the shared central database according to the local schema information stored on each backend server. The schema information stored in the backend databases does not need to refer to the central database directly.

The local schema information may reference the central schema information using various database linking technologies, such as, for example, synonyms and views.

According to an implementation, a system for managing electronic information in a distributed system comprises: a central database configured to store data, wherein the central database stores central schema information used for accessing data stored in the central database; and the central database includes one or more processors configured to: (i) receive a request for information, wherein the request is directed from a database which stores schema information which references at least a portion of the central schema information; (ii) process the request; and (iii) transmit, to the requesting database, the requested information.

According to an implementation, a system for managing electronic information in a distributed system comprises: a database configured to store schema information which references at least a portion of central schema information stored in the central database that is used for accessing data stored in the central database; and the database includes one or more processors configured to: (i) receive a request for information, (ii) redirect the request from the database to the central database based on the referenced schema information; and (iii) receive, from the central database, the requested information.

According to an implementation, a method for converting a distributed system comprises: providing a central database in communication with at least one database, the central database including central schema information for accessing data stored in the central database; transferring data from the at least one database to the central database for storage; and connecting schema information stored in the at least one database to the central schema information, such that each database is configured to: (i) receive a request for information, (ii) redirect the request from the database to the central database based on the referenced schema information; and (iii) receive, from the central database, the requested information.

Other implementations and advantageous of this disclosure will seem apparent from the following detailed description, and accompanying drawings, and the appended claims.

BRIEF DESCRIPTION OF THE DRAWINGS

FIG. 1 shows an architecture of a conventional distributed database system.

DETAILED DESCRIPTION

Figure 2:
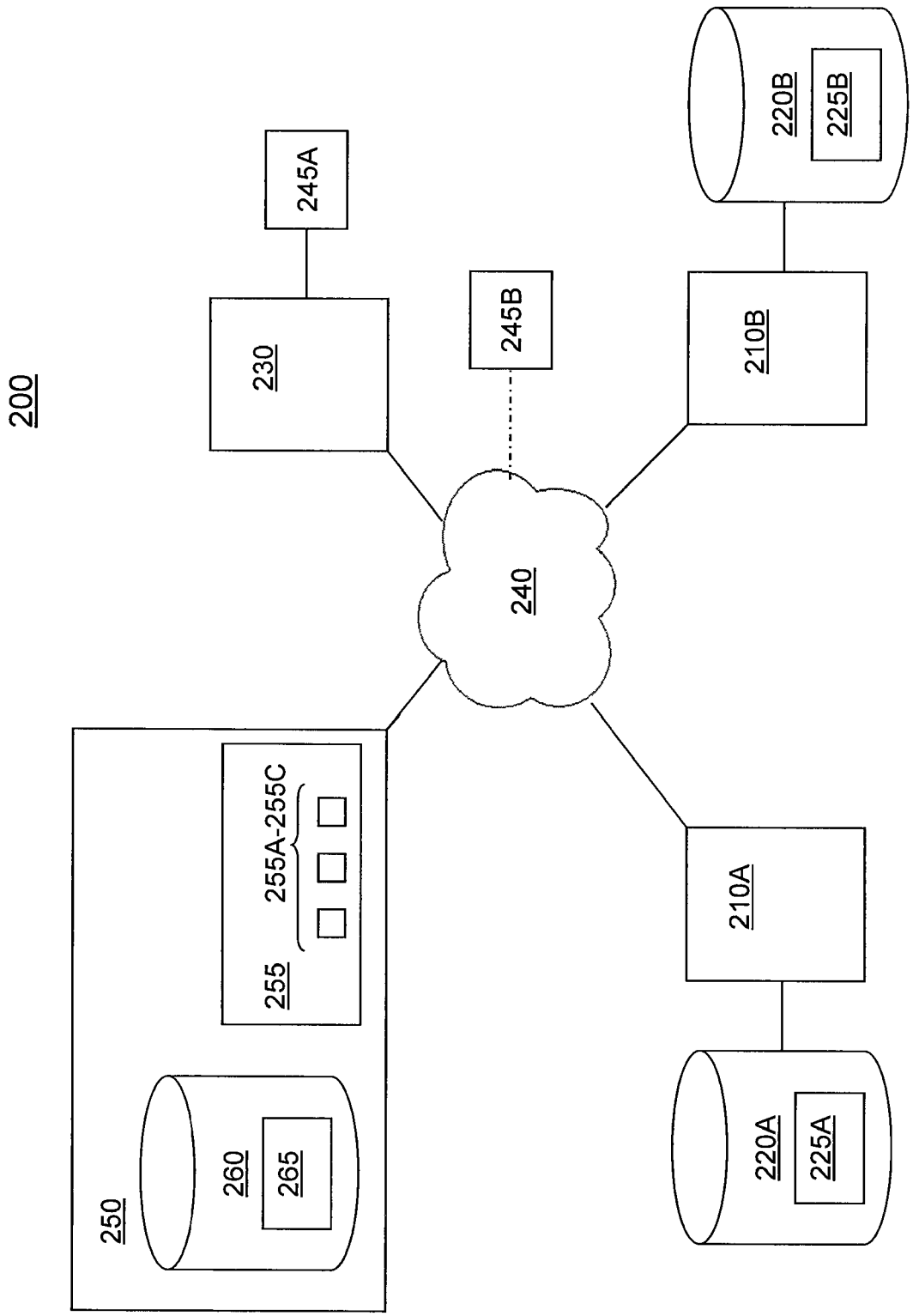
FIG. 2 shows an exemplary environment of distributed database system having a shared central database in accordance with various implementations.

FIG. 2 shows an exemplary environment of distributed database system 200 having a shared central database in accordance with various implementations. In system 200, one or more backend servers 210 are configured to collect data. Collected data may include, but is not limited to, monitored data, and/or user-input data. Instead of storing collected data locally (as in the conventional system 100 shown in FIG. 1), each backend server 210 transmits data to a central database 250.

Data may be transmitted from one or more backend servers 210 or other machines, for instance, in real-time, on a batch basis, and/or at predetermined or scheduled times. In addition, management of data collection for each of the backend servers 210 may also be executed on central database 250 in system 200. This may also enable multiple backend servers 210 to collect and transmit data to the central database 250 using the same settings and/or according to the same schedule. Although, data collection may be managed individually for each backend server 210 (as in a conventional system 100), in some instances.

For each backend sever 210 in the system 200, a user 245 may identify the information that it monitors and the data it collects. For instance, the user 245 can select various data, such as, for example, elements, or groups of elements for monitoring on each backend server 210. Storing groups and group list on the central database 250 may make this information accessible from all machines in the system 200. In addition, security and account information may be stored in the central database 250 rather than in any other machine in the system 200 (e.g., any backend server 210 or frontend server 230).

The central database 250 may be configured to store various information in the system 200. By centralizing data storage, the backend servers 210 do not have to store data locally (as in the conventional system 100). Of course, it will be appreciated that each backend server 210 could store some information which is not intended to be centralized or shared. For instance, this may include certain information specific to that machine only.

The central database 250 may include one or more machines and be configured to manage data in one or more data stores 260. The central database 250 may be configured to add, edit, and delete data stored to the central data store 260. In addition, the central database 250 is configured to process requests for information. In some implementations, the central database 250 may utilize Oracle® RAC or similar database technology.

Upon receipt of transferred data from the backend databases 220, (or other sources), the central database 250 is configured to store all data that was transmitted from the backend servers 210. Of course, other data may be stored in central database 250, as necessary or desired. This may include any information that may be shared among the various machines of the system 200.

To manage and/or access stored information on the central database 250, the central database 250 includes central schema information 265. Central schema information 265 may be stored and/or maintained, in memory in the data store 260, by the central database 250 which defines the various relationships between all the data stored in the central database 250. In some implementations, central schema information 265 includes one or more database tables defining the structure of data in data store 260.

In addition, each of the backend databases 210 includes schema information 225 which connects to the central database 250 for accessing information from the central database 250. For instance, the local schema information 225 may reference schema information of the central schema information 265. Schema information 225 may be stored and/or maintained, in memory, by each backend database 220. Each backend database 220A, 220B, may have its own schema information 225A, 225B, which reference different information from the central schema information 265 stored on the central database 250.

According to various implementations, schema information 225 may include linking elements of the conventional schema information 125 stored on backend servers to the schema information 265 stored in the central database 250. As such, applications and programs which were configured to operate in the conventional system 100 may also operate in the system 200 without modification. Calls to backend database 220 by legacy applications and programs which were configured to request information from one or more local databases 120, may be seamlessly routed to the central database 250.

One or more frontend servers 230 may also be provided to enable users to interface with the backend systems 210, in addition to the central database 250. The backend servers 210 are in communication with the frontend servers 230, for example, via one or more networks 240. For ease of discussion, only one frontend server 230 is shown. The network 240 may include any one or more of, for example, the Internet, an intranet, Local Area Network (LAN), or Wide Area Network (WAN).

One or more client computers may enable one or more users 245 to interact with various machines on the system 200, including the central database 250. Client computers may directly interface the frontend server 230, as is the case with user 245A. Alternatively or additional, client computers may interface with the central database 250 via the network 240, for instance, in the case of as user 245B.

Requests for information from the central database 250 may be made through any machine in the system 200. A user 245 may submit a request to the central database 250, for example, from a backend server 210, a frontend server 230 or any other machine in communication with the central database 250. In response to this request, the central database 250 retrieves information from the central data store 260, processing the retrieved information and then submits this information to the requesting machine.

Since all machines in the system 200 may have access to the information in the central database 250, there is no need for synchronization between machines as was required in the conventional system 100. Instabilities and inconsistencies between the various servers, which were found in the conventional system 100, can be eliminated with the system 200. Thus, the reliability of data in the system 200 is greatly improved as compared to the convention system 100.

Moreover, changes to the central shared information 265 are equally accessible to all machines in the system 200. And since all machines will see the same information, no replication or synchronization may be necessary. This may be advantageous, for instance, when the elements of the particular system 200 may change, for example, when new machines are added (and/or removed) from the system 200. When a new backend sever 210 (or frontend server 230) joins the system 200, it only needs to know the necessary credentials for connecting to the central database 250. The credentials may include, for instance, a system identification, login, user password, and/or host name where the central database 250 is located. Of course, handling configuration and security parameters of system 200 may be reserved for a limit number of users or administrators (as typical in the art).

Each backend server 210 may "appear" to store data into its own local database 220, although data may not be actually stored in the local database 220. Rather, the schema information 225 connects each backend database 220 to the central database 250 in a seamless manner to give the appearance that information is stored in the local database 220.

Applications and other programs running on any machine may "see" the same central schema information 265 and have access to the same data from central database 250. For the majority of applications which may operate on conventional system 100, no additional code is needed to be written and/or modified to operate on system. 200. In fact, only applications that may need to understand the physical architecture of system 200 (such as, for example, maintenance applications) may need to have actual knowledge of the actual underlying implementation. In one implementation, the system 200 may be configured as a performance management system, such as CA Inc.'s eHealth® Performance Management system.

The central database 250 may be configured to run or operate a database management application 255. Database management application 255 may include a plurality of modules, including but not limited to, configuration module 255A, a request module 255B, and a processing module 255C. One or more of the modules comprising application 255 may be combined or others added. For some purposes, not all modules may be necessary.

According to some implementations, the application 255 may include dedicated hardware, such as, an application specific integrated circuit (ASIC) or field programmable gate array (FPGA), software (firmware), or a combination of dedicated hardware and software.

As software, for instance, the application 255 may be stored on a computer- or machine-readable storage media having computer or machine-executable instructions executable by one or more processors. In some implementations, the application 255 may reside in a tangible memory device which may include, for example, any non-volatile electronic memory device (e.g., flash memory, EEPROM, etc.) or other memory device (e.g., disk drive, hard disk drive, writable optical disk, etc.) for storing electronic image data.

Also, in some implementations, the application 255 may be a stand-alone application running on a computer which interfaces with a printing system, for example, through a remote network connection, or via the computer- or machine-readable storage media. In some implementations, the application 255 may be a "plug-in" application that is incorporated into a third-party software application. Other configurations may also be implemented.

Oracle® database code, for example, may be used to achieve the centralization of data in the central database 250. Some references herein are made to CA Inc.'s eHealth® Performance Management system, which may utilize Oracle® Database. Of course, it will be appreciated that any number of hardware and/or software implementations, programming languages, and/or operating platforms may be used. As such, the description or recitation of any specific hardware or software implementation, programming language, database language, and operating platform herein is exemplary only and should not be viewed as limiting. For the different implementations disclosed herein, the programming and/or configuration may vary.

The configuration module 255A may be configured to manage central schema information 265 stored in data store 260 of the central database 250. Users may create, add and/or modify central schema information 265 for the system 200.

The request module 255B may be configured to receive a request for information from the one or more machines in system 200. Such requests may be initiated by one or more users 245, or applications or programs running of a machine in the system 200. For instance, a request for information may be a query. Other requests for information may be required for generating reports.

The processing module 255C is configured to manage data stored in the central database 250, and to respond to requests for information from one or more machines in the system 200, and to process information requests in the central database 250. Data may be added, removed, or modified in the central database 250 as desired. For instance, data collected and transmitted by one or more backend servers 210 is stored in central database 250.

Requests for information may be made by a backend server 210, a frontend server 230, or other machine in the system 200. Schema information 265 in the central database 250 may be used to access information stored in the data store 260 in the central database 250.

Figure 3:
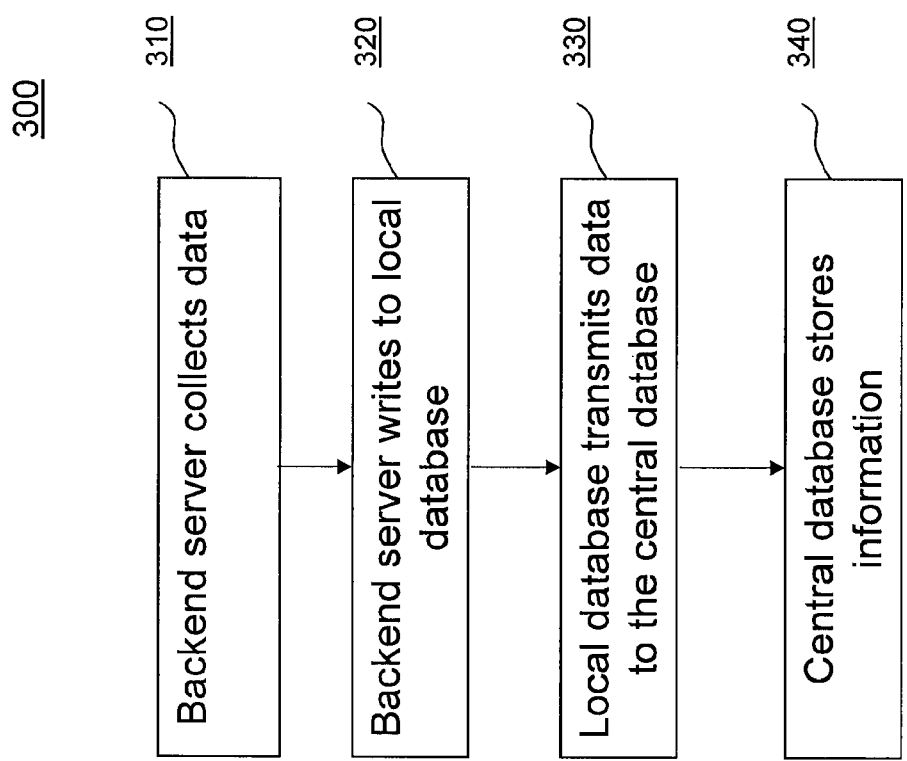
FIG. 3 illustrates an exemplary process for populating the shared central database with data collected by a machine in accordance with various implementations.

FIG. 3 illustrates an exemplary process 300 for populating the shared central database 250 with data collected from a machine in accordance with various implementations.

For ease of discussion, the process 300 will be described with respect to a single backend server 210. Of course, it will be appreciated that the process 300 may be performed by any machine on system 200 in a similar manner.

In step 310, the backend server 210 collects data. For instance, the backend server 210 may be configured to monitor one or more devices, such as routers, and collect information. Data might also be input by a user in communication with the backend server, and/or from applications, services, or programs running on the backend server 210. The backend server may be configured to collect data instantaneous and/or on a predetermined basis (e.g., every 5 minutes). Information in the backend server 210 may instruct the backend server 210 as to what data to collect, and how to transmit it to the central database 250. The data may be transmitted essentially as collected, in real-time, or in a batched manner, for instance, at predetermined intervals, or at scheduled times. The backend server 210 may incorporate information into the transmitted data in order to indicate to the central database 250 that it came from that backend server. For instance, a field in the transmitted data may be reserved for a machine identifier (with each server in the system 200 having a different identifier).

Next, in step 320, the backend server 210 writes the collected data to the local database 220. In step 330, through the connected local schema 225, the data is transmitted to the central database 250 for storage (rather than in the local database 220).

In step 340, upon receipt of the collected data by the central database 250, the central database 250 writes the data into the data store 260. The stored data may include the machine identify information. This allows the machines to have knowledge of the data which they actually collected.

Accordingly, all data collected by the backend servers 210 may be centrally stored in one shared central database 250. In some instances, collected data may be processed by one or more machines (e.g., the backend server 210 and/or central database 250) to format data. Thus, the collected data may have the same format for storage.

Figure 4:
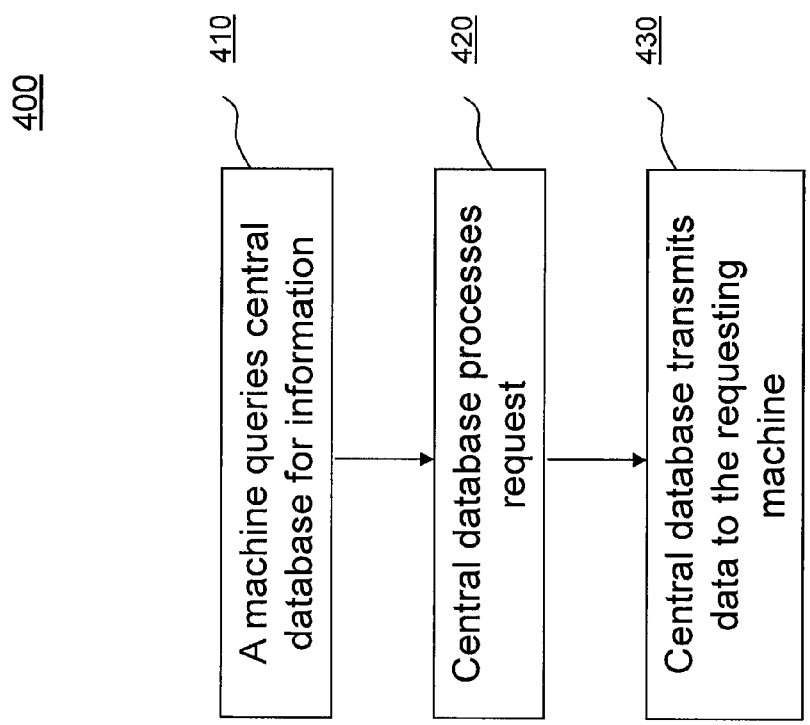
FIG. 4 illustrates an exemplary process for directly requesting information from the shared central database in accordance with various implementations.

FIG. 4 illustrates an exemplary process 400 for directly requesting information from the shared central database 250 in accordance with various implementations.

In step 410, a request is made to the central database 250. Requests may be made by any machine in the system 200 to the central database 250. Unlike the conventional system 100 shown in FIG. 1, a single request for information may be made for stored data for the entire system 200, rather than multiple requests being made to individual backend servers 210. Data requests thus may be processed in fewer steps, and quicker than in the conventional system 100. This may be beneficial, for instance, for running reports.

Upon receipt of a request for information, in step 420, the central database 250 accesses the data store 260 to process the request for information. The central database 250 includes central schema information 265 for accessing the data store 260 in the central database 250. Additional processing of the data may be performed by the central database 250, if necessary, but may not be required. Finally, in step 430, the central database 250 transmits the information to the machine which makes the initial request for information.

While process 400 enables requests for information directly from the central database 250, such requests must be made by applications and programs which have knowledge of the central database 250. Some applications or programs, however, may not be aware of the central database 250, much less be configured to make requests to the central database 250. This may be especially true for legacy applications or other programs (for example, in the conventional system 100) which were configured to make requests for information from local databases 120.

Figure 5:
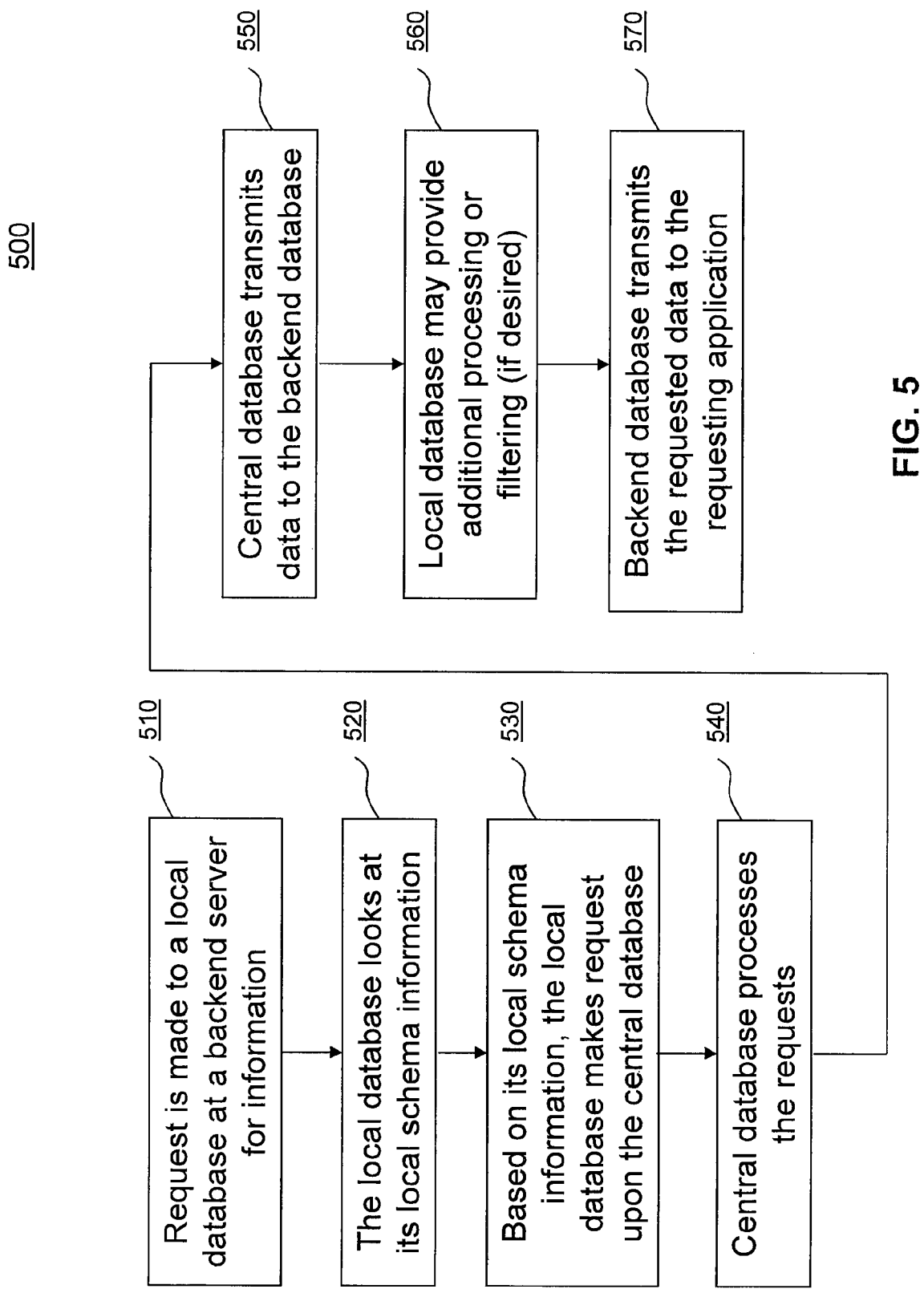
FIG. 5 illustrates an exemplary process for requesting information from the shared central database, via a request for information from one or more databases, in accordance with various implementations.

FIG. 5 illustrates an exemplary process 500 for requesting information from the shared central database 250 via a request for information from a local database 220 connected to a backend server 210, in accordance with various implementations.

Applications and software operating in system 200 therefore do not have to be aware of, and/or configured to make requests for information from the central database 250. Rather, the process 500 provides an essentially "seamless" process for requesting information from the central database 250. Moreover, applications which were originally configured to run on the conventional system 100 may still operate in system 200. New modifications to these applications may not be necessary. These programs can still make requests for information to local database, which they believe are storing data. However, because of the connected schema information 225 stored in each local database 220, requests for information from local database 220 may be routed to central database 250 instead. In fact, local databases 220 in system 200 are not required to individually store data collected the backend servers 210.

For ease of discussion, the process 500 will be described with respect to a single backend server 210 (although it will be appreciated that the process 500 may be performed by any machine in the system 200).

In step 510, a request for information is made to a local database 220 in communication with a backend server 210. The request may be made by any machine in the system 200. For instance, requests may be made by an application or program running on the backend server 210 or another machine, such as the frontend server 230. Upon receipt of a request for information, in step 520, the local database 220 looks at its own schema information 225. Based on the referenced or linked schema information 225, stored in the local database 220, the request for information may be routed to the central database 250, in step 530.

In step 540, the central database 250 processes the request by accessing the data store 260. The central database 250 then transmits the requested data to the local database 220 (which information was requested in step 550). Additional processing of the data may be performed by the local database 220, if necessary, but it is not required. Finally, in step 570, the backend database server 220 transmits to the requesting application.

Figure 6:
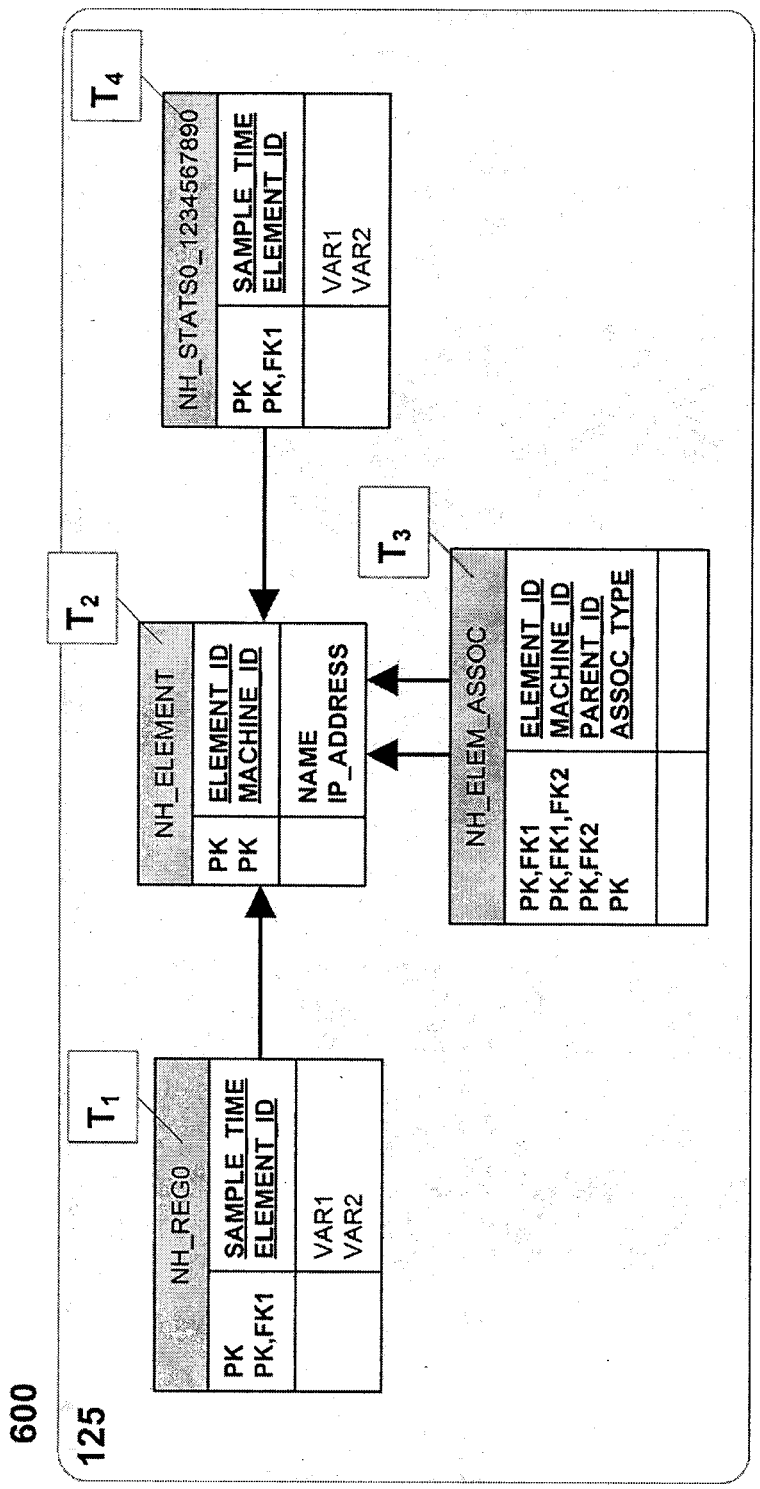
FIG. 6 illustrates how an exemplary database schema may appear in conventional schema information stored in one database in the conventional system in accordance with a conventional implementation.

FIG. 6 illustrates how an exemplary database schema 600 may look like in conventional schema information 125 stored in one backend database 120 in the conventional system 100 in accordance with a conventional implementation.

There may be multiple tables in a database 120 with schema information 125 defining the various relationships between them. In one example, there may be four tables: NH_REGO $T_1$; NH_ELEMENT $T_2$; NH_ELEM_ASSOC $T_3$; and NH_STAT0 $T_4$. These tables are specific to CA Inc.'s eHealth® system and should not be considered limiting. Other schema information may be used. For instance, PK stands for primary key, while FK stands for foreign key. These provide indications of relationships amongst the various columns in the local database 120. For example, in table $T_2$, the columns ELEMENT_ID and MACHINE_ID together form the primary key for the table. In Table $T_4$, there are two foreign keys ELEMENT_ID/MACHINE_ID and PARENT_ID/MACHINE_ID that are used to refer to entries in a separate table (in this case, table $T_2$).

Figure 7:
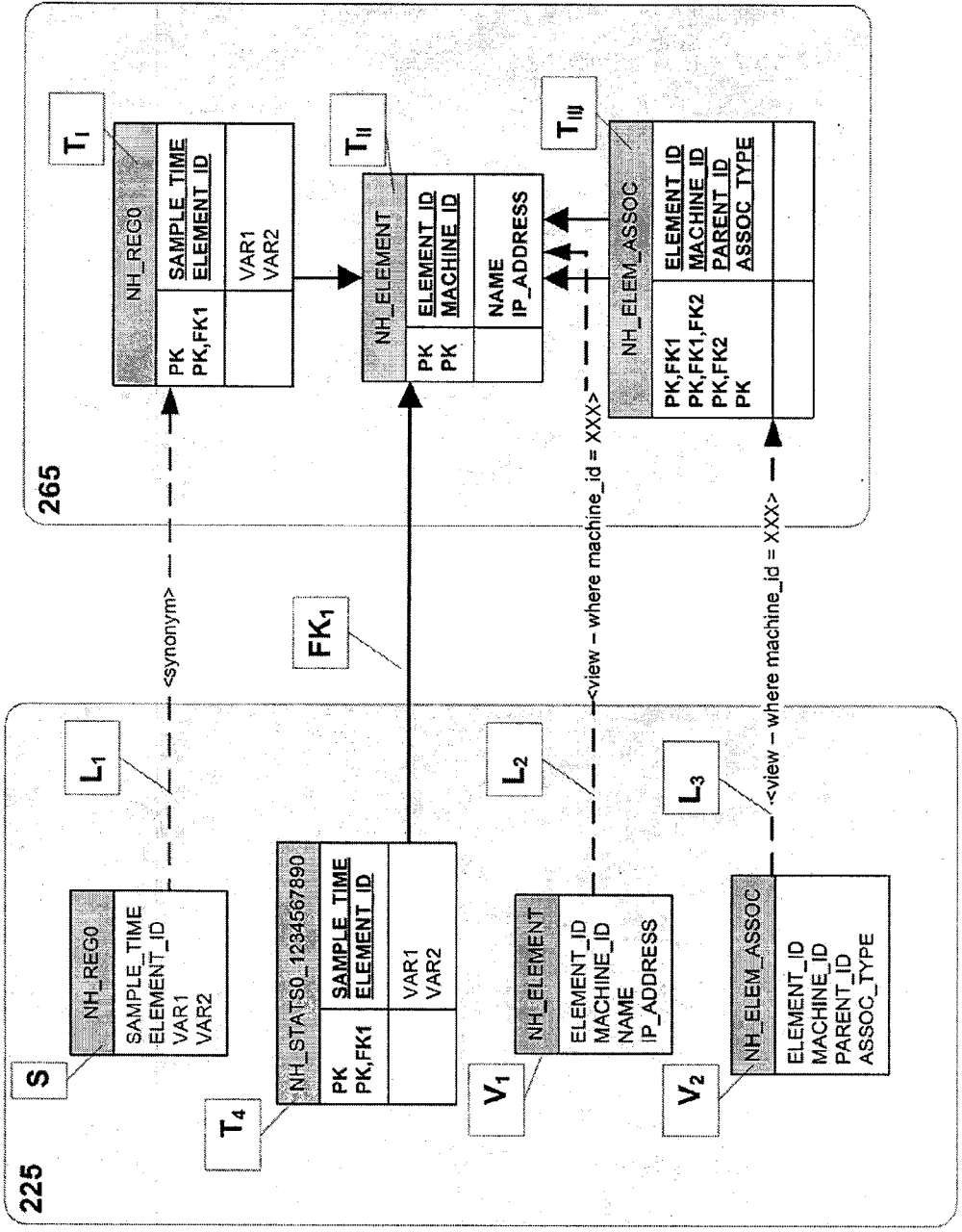
FIG. 7 illustrates an exemplary scenario for how the conventionally-implemented database schema shown in FIG. 6 may be expressed in schema information stored in both a local database and the shared central database in accordance with various implementations.

FIG. 7 illustrates exemplary scenario 700 for how the database schema 600 might be expressed in system 200 in accordance with various implementations.

Rather than having the individual schema 600 refer to data stored locally, local schema information 225 stored in each backend database 220 is connected to central schema information 265 stored in central database 250. A database linking technology, for instance Oracle's DB Link, may be used to connect local schema information 225 stored on each backend database 220 with the central schema information 265. As such, data stored in the central database 250 may be accessed by the backend database 220.

The local schema information 225 appears to an application running in the system 200 to be the locally stored schema 600 for accessing a local backend database 220. Yet, in actuality the schema information 225 may not access any stored data on the local database 220. Rather, it is connected to the central database 250 and references the central schema information 265 for accessing the central data store 260.

As shown, three links $L_1$-$L_3$ have may have been added to local schema information 225 to allow a connection between the local schema information 225 and the central schema information 265. These links may insert a pointer element into the local schema information 225 in the backend database 220 which "points" to the central schema information 265 stored in the central database 250.

Central schema information 265 stored in the central database 250 may have three tables NH_REG0 $T_I$; NH_ELEMENT $T_{II}$; and NH_ELEMENT_ASSOC $T_{III}$. This is a case, where only some of the information in the local database was moved to the central database. The table $T_4$ remains in the local database, where all the other tables are in the central database. A foreign key relationship $FK_I$ connects table $T_4$ in the local schema information 225 to the table $T_{II}$ in the central schema information 265.

To a user of the local database, all four schema objects (i.e., NH_REG0, NH_STATS0, NH_ELEMENT, and NH_ELEM_ASSOC) are still visible. The user does not need to understand that only one is stored locally, while the others are accessed through the links are stored in the central database. These tables are configured to store all collected data in the system 200 (not just from a single backend server 210).

Linked schema information 225 shown in FIG. 7 has one table $T_4$, two views $V_1$, $V_2$, and one synonym S where the original database scheme 600 had four tables $T_1$-$T_4$ in FIG. 6. For instance, a single, unidirectional Oracle® DB Link may be used to link tables in the schema information 225 and the schema information 265 in central database 250 may be used. Additional information, such as the view and synonym may be required to "link" the systems. A link may be created using a data definition language (DDL) statement as follows:

```
create database link cdb connect to <centraldbuser>
    identified by <centraldbpassword> using '<listenerName>'
```

There may be credentials that tell Oracle® database how to access the central database 250. Access to the database may involve specifying a known name (e.g., centraluser), password (e.g., centralpassword) and an address (e.g., listenerName). This code creates a link named "cdb" in local schema information 225 stored in the backend database 220, that can be used to reference the central schema information 265 stored in the central database 250. This operation may be executed when initially implementing the schema information 225 in a backend database 220.

Once a link has been created, queries of the central database 250 may be made by referencing that link. The schema information 225 stored in the backend database 210 does not need to refer to the central database 250 directly.

For instance, the following structured query language (SQL) command may be performed against the local schema information 225 stored in the backend database 220 to query the "elements" table, NH_ELEMENT, in the central database 250:

select element_id, name from nh_element@cdb;

This query exposes the link to the user of the application. However, the user does not need to know about the link. Instead, a view or synonym can be created in the local schema information 225. The addition of "@cdb" to the table name indicates a reference across the DB Link. In the above exemplary call, element_id is a specific column from a table, nh_element table. This query retrieves the set of element_id, name pairs from the database.

References in the schema information 225 can be made by actually referring to storage in the central database 250. This may be performed, for instance, using a view operation, or a synonym operation. Oracle®, for instance, supports these operations.

For schema information 225 which may contain exactly the same contents on all backend server 210 in the system 200, a synonym may be used to refer to central schema information 265 in the central database 250.

For instance, an Oracle® synonym may be used to create an alias for the central table. The synonym S may be created in the schema information 225 referencing the NH_REG table $T_4$ in the central schema information 265 using the following SQL command:

create synonym NH_REG0 for NH_REG0@CDB

This creates link $L_1$. Applications and programs can both read and write elements using the synonym S, which in turn reads and writes information in the central database 250. Synonyms expose data in the central database 250 to the backend database 220, regardless of whether that data was actually collected on its associated backend server 210.

On the other hand, for schema information 225 whose contents may be different on one or more backend servers 220 in the system 200, a view operation may be used in the backend database 220 which queries the central schema information 265 in the central database 250. In addition, view operations may enable filtering by a machine specific criterion. The machine specific criteria may include, for example, a machine identifier, specific for a particular machine. As such, each backend database 220 may have access to only that data which it collected.

Applications or programs running on backend servers 210 may not need access to all data from a table in central schema information 265. Accordingly, a database "view" technique can be used to filter data by a particular machine identifier, machine_id, corresponding to that backend server. View $V_1$ in the local schema information 225 referencing the NH_ELEMENT Table $T_{II}$ may be created, for example, using the following commands:

```
create or replace view nh_element as
    select * from nh_element@cdb where machine id = 12345;
```

This command creates a view which selects only the elements from local schema information 225 which may need to be seen at the backend server 210 (having the identifier 12345). View $V_2$ in the local schema information 225 referencing the NH_ELEM_ASSOC Table $T_{III}$ may be created in an analogous manner.

```
create or replace view nh_elem_assoc as
    select * from nh_elem_assoct@cdb where machine id = 12345;
```

These commands create links $L_2$ and $L_3$. Applications and programs can both read and write elements to this view, which in turn reads and writes information in the central database 250. Filtering data, though, may be by resource expensive (e.g., requiring additional processing). Thus, view operations may not be used in all instances.

Figure 8:
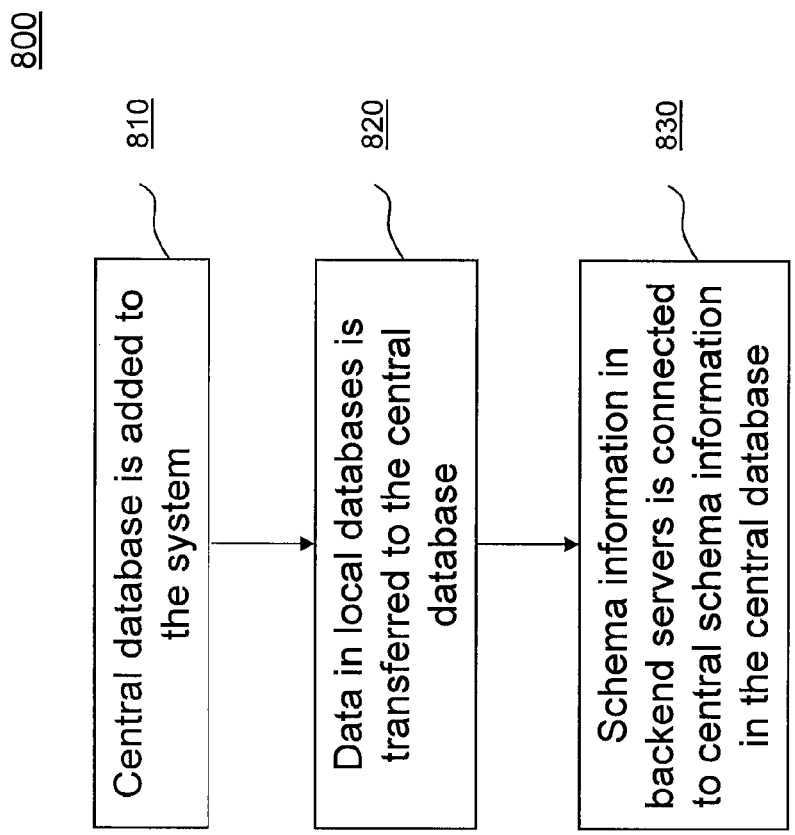
FIG. 8 illustrates an exemplary process for converting the conventional system to a distributed database system having a shared central database in accordance with various implementations.

FIG. 8 illustrates an exemplary process 800 for converting the conventional system 100 to a system 200 in accordance with various implementations.

The process 800 may enable conventional system 100 to be used as the initial hardware platform for a new system 200. Thus, the system 200 may be created without substantially disrupting the operation of users of the distributed system. Current users of the system 100 may in fact not be aware that the system has been changed to system 200. Applications and programs configured to run in conventional system 100 may still run in system 200. Moreover, current users and new users, alike, may take advantage of the benefits of a shared centralized system.

Before conversion, the local database 120 contents and local schema information 125 can be saved. Thus, if there is a problem during conversion, changes may be rolled-back to the previous configurations, if an error in the conversions process. This process may be automatic. This might also give users the flexibility to withdraw from the system 200.

In step 810, a central database 250 is provided. Each backend system 110/210 is to be in communication with the central database 250, so as to transfer and receive information from central database 250. In one instance, the system 100 may be put into "quiet mode" so that no configuration changes are made during the conversion process.

The first step in the migration process may be to build database connections from the local database 120 to the central database 250. This may be accomplished with the following SQL command:

```
create database link central connect to <CCDB user> identified by
    <CCDB password> using <listener name>
```

In step 820, data that was stored on each local database 120 may then be transferred to central database 250. For upgrading CA Inc.'s eHealth® systems, the data transferred may include, for example, elements, groups, service profiles, live configuration, and web users. Other systems may have their own unique data.

Migration may be a serial process, so when a table is being migrated from local schema 225 to its respective target in central database 250, each migrating row may require a check to see if its identifying attribute (for example, its name) matches a row that is already resident in the centralized table. If a match is found, an algorithm may be used to determine if an update is required to the existing centralized row, or a new, modified row should be added instead. Such an algorithm may use a mapping table in the central database 250 to track changes made to the central database.

For example, if no table information exists in central schema information 265 in the central database 250, then a new table may be created or inserted. If table information does exist in the central database 250, then schema information 125 from the local database(s) 120 will be mapped to the central schema information 265. This may include, for instance, mapping a new entry, such as a row, column, etc. into a table in the central schema information 265.

Migration of data from the local databases 120 to the central database 250 may be performed by a script or other program configured for transferring data from one database to another. Data from local databases 120 may be formatted for storing on the central database 250. This way, once a backend database 120/220 becomes a part of the system 200, all its migrated information is then present and visible to all machines in system 200. Care may need to be taken to ensure that data inconsistencies, for instance, among different databases 120 are addressed.

In the conventional system 100, since each backend server 110 had into own database 120, conventional schema information 125 stored in backend databases 120 may have been indexed by local identifier, such as, for example, element_id, in the eHealth® system. Other tables may have other identifiers. Unfortunately, element_id may not be unique across the system 100 because more than one backend server 110 may use the same value for element_id. This may make using element_id inappropriate as an unique identifier in the central schema information 265 in the central database 250.

Thus, according to various implementations, data in stored in the central database 250 may be indexed using a global identifier that is unique across the entire system 200, not just by particular machine. Global identifiers may be allocated, for example, through an Oracle® sequence operation or similar technology to generate unique values. For example, the SQL code below constructs an object in the local schema 225 that is a link to the schema object in the central database 250.

```
create or replace synonym nh_element_gid_seq for
    nh_element_gid_seq@cdb
```

This schema object (i.e., the sequence) can then be used to allocate unique identifier. Then, to use the Oracle® sequence object, a corresponding query may be run to allocate to new value from the sequence, as follows:

select nh_element_gid_seq.nextval from dual

Placing the sequence in the central database 250 enables applications to execute generate different IDs, regardless of which machine in the system 200 is running the statement.

For some data, the only change that may be needed to centralize that schema information may be the addition of a global element identifier. This may be the case, for CA Inc.'s eHealth Performance Management for example, for elements data. The global identifiers may be assigned to tables, such as elements, as they are migrated to values assigned by the central database 250, regardless of whether they have already been assigned local values by a standalone machine that is joining the system 200. As data is migrated from a local database 120 to the central database 250, the global element identifier may be reassigned to a value consistent with a global table in the central schema information 265.

Each local database 120 might also merge data having the same machine identifier, machine_id into the central database 250 For example, groups data in eHealth® may be merged by name. If a local database 120 has data that does not exist on the central database 250, it may be added to the central database 250. On the other hand, if the local machine has data that is already on central database 250, it may be ignored and assumed to be a duplicate of a centralized copy. Also, if the local database 120 has the same name, but a unique identifier, this data may be assumed to be semantically equivalent. This may lead to a mapping which may need to be applied along with the element global id mapping to the group members as they are migrated.

Once data has been moved to the central database 250, it may no longer need to be replicated by the local database 120/220 for other members of the system 200.

Some data may be merged from local database 120/220 into a single copy on the central database 250. This may be the case, for instance, for live health configuration data in eHealth®. A goal of merging data may thus, be to provide a single set of profiles, subjects and associations that represent the smallest set of the ones that exist over the system 100/200. One rule that may be used to merge data is that profiles which have the same name and the exact same rule set are merged and their associations unified. Subjects may be merged based on having a common target group or group list. Associations can be similarly merged based on being completely the same (or pointing to a semantically equivalent profile and subject). All of these items may receive new global identifiers as they are merged to prevent identifier collisions.

User names may have to also be transferred to the central database 250. In the case of CA Inc.'s eHealth® Performance Management, for every user to be migrated to the system 200, a check may be performed to see if that user has both the same name and the same permissions on the same objects (e.g., groups, group lists, etc.) on the central database 250. If a match does not exist, the data on the current local user will be inserted into the central database 250. However, if a match is found on the central database 250, the user may be prompted to select one name and profile to be used throughout system 200.

The next local database 120 may then be considered for migration to the system 200. Once data has been moved to the central database 250, it may no longer need to be replicated by the local database 120/220 for other members of the system 200.

Next, in step 830, the local schema information 125 which references data stored in local database 120, may be linked to the central database 250 (as described in one or more implementations herein). For instance, the schema information 225 may reference the central schema information 265 stored in the central database 250, whereas the conventional schema information 125 only references data stored in a local database 120.

Each local database 120/220 can be set up to use the central schema information 265 rather than the local schema information 225. For tables remaining in the local database 120/220, local schema information 125 may be unchanged, but for tables that have been copied to the central database 250, local schema information 225 may be modified to reference central schema information 265. Tables that are migrating will be referenced the same way locally by the application, but internal to the local database using a synonym creating a link to the respective location in the central database. Tables that remain local may join newly centralized tables by use of the synonym as well.

Once migration has completed for a respective backend server, it is 210 now configured to reference the central database as needed to conduct its normal operations. Its local database 120 remains in system 200, with collected data now being stored on the central database 250.

In an embodiment, there is provided a computer-implemented method for managing electronic information in a distributed system comprising: receiving a request for information, at a central database, wherein the central database stores central schema information used for accessing data stored in the central database and the request is directed from a database which stores schema information which references at least a portion of the central schema information; processing the request at the central database; and transmitting, to the requesting database, the requested information.

In an embodiment, the central schema information comprises one or more tables defining one or more relationships of data stored in the central database. In an embodiment, the referencing schema information links to a table of the central schema information. In an embodiment, the link is an Oracle® DB Link or similar technology. In an embodiment, the referencing schema information includes at least one synonym pointing to the table of the central schema information. In an embodiment, the referencing schema information includes a view that queries the table of the central schema information. In an embodiment, the view queries the central schema information using an identifier, with each server having a unique identifier element. In an embodiment, data stored in the central database include an identifier that is unique to all machines in communication with the central database. In an embodiment, the request for information is made by an application running on a server.

In an embodiment, there is provided a computer-implemented method for managing electronic information in a distributed system comprising: receiving, at a database, a request for information, wherein the database stores schema information which references at least a portion of central schema information stored in a central database that is used for accessing data stored in the central database; redirecting the request from the database to the central database based on the referenced schema information; and receiving, at the database, the requested data from the central database.

In an embodiment, the central schema information comprises one or more tables defining one or more relationships of data stored in the central database. In an embodiment, the referencing schema information links to a table of the central schema information. In an embodiment, the link is an Oracle® DB Link or similar technology. In an embodiment, the referencing schema information includes at least one synonym pointing to the table of the central schema information. In an embodiment, the referencing schema information includes a view that queries the table of the central schema information. In an embodiment, the view queries the central schema information using an identifier, with each server having a unique identifier element. In an embodiment, data stored in the central database include an identifier that is unique to all machines in communication with the central database. In an embodiment, the request for information is made by an application running on a server.

In an embodiment, there is provided a system for managing electronic information in a distributed system comprising: a central database configured to store data, wherein the central database stores central schema information used for accessing data stored in the central database; and the central database includes one or more processors configured to: (i) receive a request for information, wherein the request is directed from a database which stores schema information which references at least a portion of the central schema information; (ii) process the request; and (iii) transmit, to the requesting database, the requested information.

In an embodiment, there is provided a system for managing electronic information in a distributed system comprising: a database configured to store schema information which references at least a portion of central schema information stored in the central database that is used for accessing data stored in the central database; and the database includes one or more processors configured to: (i) receive a request for information, (ii) redirect the request from the database to the central database based on the referenced schema information; and (iii) receive, from the central database, the requested information.

In an embodiment, there is provided a method for converting a distributed system, the method comprising: providing a central database in communication with at least one database, the central database including central schema information for accessing data stored in the central database; transferring content data and schema information from the at least one database to the central database for storage; and connecting schema information stored in the at least one database to the central schema information, such that each database is configured to: (i) receive a request for information, (ii) redirect the request from the database to the central database based on the referenced schema information; and (iii) receive, from the central database, the requested information.

In an embodiment, transferring content data to the central database comprises: determining if data already exists on the central database, and only if it does not, the data is then added to the central database. In an embodiment, transferring content data to the central database comprises formatting the data for storage on the central database. In an embodiment, each database's data contents and local schema information is saved prior to being connected to the central database. In an embodiment, transferring schema information to the central database comprises determining if the schema information from the database exists in the central schema information, and if it does not, inserting at least a portion of the schema information into the central schema information.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

The invention claimed is:

1. A method to convert a distributed system, the method comprising:
   electronically transferring content data and schema information from a database coupled to a hardware processor to a central database for storage, the central database including central schema information for accessing data stored in the central database; and
   connecting schema information stored in the database to the central schema information by a link to a table of the central schema information, such that the database is configured to:
   (i) receive a request for requested information,
   (ii) redirect the request from the database to the central database based on the linked schema information; and
   (iii) receive, from the central database, the requested information.

2. The method according to claim 1, wherein the transferring content data to the central database comprises determining whether the content data already exists on the central database, and only when the content data does not exist on the central database, adding the content data to the central database.

3. The method according to claim 1, wherein the transferring content data to the central database comprises formatting the content data for storage on the central database.

4. The method according to claim 1, wherein the content data and schema information of the database is saved prior to being connected to the central database.

5. The method according to claim 1, wherein transferring schema information to the central database comprises determining whether the schema information from the database exists in the central schema information, and when the schema information does not exist in the central schema information, inserting at least a portion of the schema information into the central schema information.

6. The method according to claim 1, wherein the link between the schema information and the table of the central schema information is created by a database linking technology.

7. The method according to claim 1, wherein the schema information includes a synonym pointing to a table of the central schema information, the table defining a relationship of the data stored in the central database.

8. The method according to claim 1, wherein the schema information includes a view that queries the table of the central schema information.

9. The method according to claim 8, wherein the view queries the central schema information using a unique identifier associated with a server.

10. The method according to claim 1, wherein the data stored in the central database includes an identifier that is unique to all machines in communication with the central database.

11. A computer program product comprising:
    a non-transitory computer readable storage medium comprising computer-readable program code embodied therewith to convert a distributed system, the computer readable program code comprising:
    computer readable program code configured to electronically transferring content data and schema information from a database coupled to a hardware processor to a central database for storage, the central database including central schema information for accessing data stored in the central database; and
    computer readable program code configured to connecting schema information stored in the database to the central schema information by a link to a table of the central schema information, such that the database is configured to:
    (i) receive a request for requested information,
    (ii) redirect the request from the database to the central database based on the linked schema information; and
    (iii) receive, from the central database, the requested information.

12. The computer program product according to claim 11, wherein the computer readable program code configured to transfer content data to the central database is further configured to determine whether the content data already exists on the central database, and only when the content data does not exist on the central database, adding the content data to the central database.

13. The computer program product according to claim 11, wherein the computer readable program code configured to transfer content data to the central database is further configured to format the content data for storage on the central database.

14. The computer program product according to claim 11, wherein the computer readable program code configured to transfer content data to the central database is further configured to determine whether the schema information from the database exists in the central schema information, and when the schema information does not exist in the central schema information, inserting at least a portion of the schema information into the central schema information.

15. The computer program product according to claim 11, wherein the link between the schema information and the table of the central schema information is created by a database linking technology.

16. The computer program product according to claim 11, wherein the schema information includes a synonym pointing to a table of the central schema information, the table defining a relationship of the data stored in the central database.

17. The computer program product according to claim 11, wherein the schema information includes a view that queries the table of the central schema information.

18. The computer program product according to claim 17, wherein the view queries the central schema information using a unique identifier associated with a server.

19. The computer program product according to claim 11, wherein the data stored in the central database includes an identifier that is unique to all machines in communication with the central database.

20. A system for managing electronic information in a distributed system, the system comprising:

a database configured to store content data and schema information;

a hardware processor coupled to the database, the processor configured to:

(i) electronically transfer the content data and schema information from the database to a central database for storage, the central database including central schema information for accessing data stored in the central database; and (ii) connect schema information stored in the database to the central schema information by a link to a table of the central schema information, such that the database is configured to:

(a) receive a request for requested information, (b) redirect the request from the database to the central database based on the linked schema information; and (c) receive, from the central database, the requested information.

* * * * *